H. W. WEED.
PROTECTOR FOR WIND SHIELDS.
APPLICATION FILED NOV. 10, 1917.
1,287,162.
Patented Dec. 10, 1918.
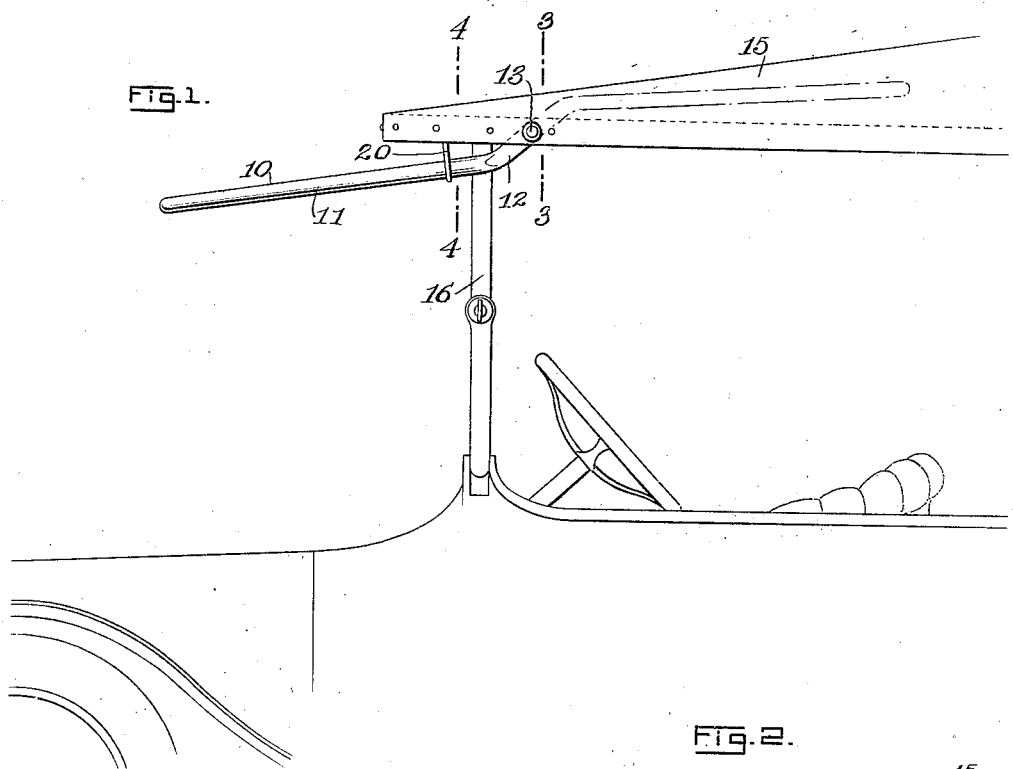
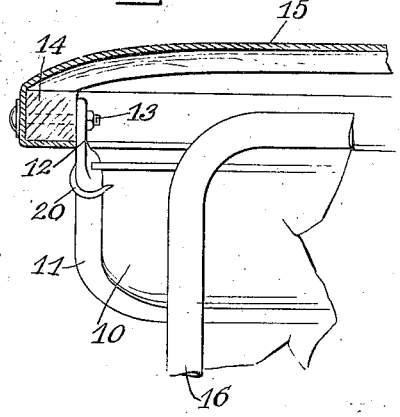
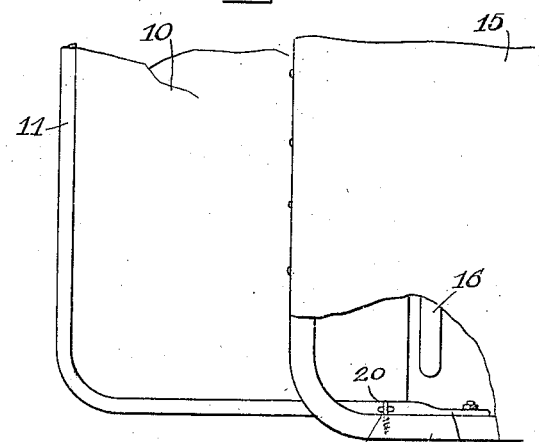
WITNESSES
INVENTOR
Howard W. Weed
BY
ATTORNEYS

UNITED STATES PATENT OFFICE.

HOWARD W. WEED, OF CLEVELAND, OHIO.

PROTECTOR FOR WIND-SHIELDS.

1,287,162.

Specification of Letters Patent.  Patented Dec. 10, 1918.

Application filed November 10, 1917.  Serial No. 201,334.

*To all whom it may concern:*

Be it known that I, HOWARD W. WEED, a citizen of the United States, and a resident of Cleveland, in the county of Cuyahoga and State of Ohio, have invented a new and Improved Protector for Wind-Shields, of which the following is a full, clear, and exact description.

The object of the invention is to provide a new and improved protector or hood for wind shields of automobiles and similar vehicles, and arranged to protect the wind shield from rain, snow, sleet or other extraneous matter. Another object is to provide a protector which forms a permanent part of the vehicle top and readily folds with the same when the top and the protector are not used.

In order to accomplish the desired result, use is made of a panel or a guard attached to the front end of the top of the automobile and projecting forwardly beyond the wind shield wholly independent thereof.

A practical embodiment of the invention is represented in the accompanying drawings forming a part of this specification, in which similar characters of reference indicate corresponding parts in all the views.

Figure 1 is a side elevation of the protector as applied to an automobile;

Fig. 2 is a plan view of the same with part of the automobile top broken out;

Fig. 3 is an enlarged cross section of the same on the line 3—3 of Fig. 1; and

Fig. 4 is a similar view of the same on the line 4—4 of Fig. 1.

The protector or hood is in the form of a panel or guard 10 of glass or other diaphanous or opaque material mounted in a frame 11, preferably made of metal. The sides of the frame 11 have rearwardly projecting portions 12 mounted to swing on pivots 13 attached to the sides 14 of the automobile top 15 of usual construction and adapted to be folded back or extended forwardly to reach over the wind shield 16, as plainly indicated in the drawings. The rear edge of the panel 10 extends close to the front of the wind shield 16 and the pivots 13 are located somewhat in the rear of the wind shield 16, as plainly indicated in the drawings.

In order to hold the protector in downwardly inclined position, as shown in the drawings, various supporting means may be employed to wholly support the protector from the top 15 of the automobile and wholly independent of the wind shield 16. As shown in the drawings, the supporting means consists of hooks 20 pivoted on screw eyes 21 attached to the sides 14 of the automobile top 15, the hooks engaging the frame 11 in front of the wind shield 16. When the top 15 is folded back in the usual manner the hooks 20 are disengaged from the frame 11 to permit of swinging the frame and its panel back under the automobile top 15, as indicated in dotted lines in Fig. 1, to permit of folding the protector with the automobile top, of which the protector forms a permanent part.

It is understood that when the protector is in extended position it readily protects the wind shield 16 against rain, sleet, snow and other extraneous matter so as not to obscure the vision of the driver of the automobile.

In case the panel 10 is made of opaque material it also serves to protect the driver against the glare of the snow.

Having thus described my invention, I claim as new and desire to secure by Letters Patent:—

1. In an automobile having a foldable top, a protector for the wind shield, comprising a panel pivoted to the front end of the top of the automobile in the rear of the wind shield and projecting forwardly beyond the wind shield and wholly independent thereof, and means for holding the panel in adjusted positions.

2. In an automobile, a protector for the wind shield and forming a permanent part of the automobile top, the protector comprising a panel having a frame the side members of which project beyond the panel and pivoted on the sides of the automobile top in rear of the wind shield, the panel projecting forwardly beyond the wind shield, and means carried by the automobile top to hold the panel in extended position and wholly independent of the wind shield.

3. In an automobile, a protector for the wind shield and forming a permanent part of the automobile top, the protector comprising a panel having a frame pivoted on the sides of the automobile top, the panel projecting beyond the front of the wind shield and the rear ends of the frame being extended rearwardly beyond the wind shield, the rear ends of the frame being pivoted on the sides of the automobile top; and means carried by the automobile top and engaging the said frame forward of the wind shield to support the panel in extended position and wholly independent of the wind shield.

4. In an automobile, a protector for the wind shield and forming a permanent part of the automobile top, the protector comprising a panel having a frame pivoted on the sides of the automobile top, the panel projecting beyond the front of the wind shield and the rear ends of the frame being extended rearwardly beyond the wind shield, the rear ends of the frame being pivoted on the sides of the automobile top, and hooks held on the automobile top in front of the wind shield and engaging the panel frame to support the panel in extended position and wholly independent of the wind shield.

5. In an automobile, a protector for the wind shield, comprising a panel having side members extending rearwardly beyond the panel and pivoted to the sides of the top of the automobile a distance from its front edge, said protector being adapted to swing forwardly in front of the wind shield or to swing rearwardly under the top, and means carried by the top and engaging the panel for holding it in its forwardly projecting position.

HOWARD W. WEED.